United States Patent [19]

Bushmeyer et al.

[11] 4,279,446
[45] Jul. 21, 1981

[54] SEGMENTED WHEEL CLAMP

[75] Inventors: Richard W. Bushmeyer, Burlington; Thomas M. Schwabe, Hales Corners, both of Wis.

[73] Assignee: J. I. Case Company, Racine, Wis.

[21] Appl. No.: 115,462

[22] Filed: Jan. 25, 1980

[51] Int. Cl.³ .............................................. B60B 23/00
[52] U.S. Cl. .................................... 301/20; 301/9 DN
[58] Field of Search ............... 301/10 R, 11R, 18, 19, 301/20, 23, 24, 9 R, 9 DN, 63 D, 105 S, 11 S, 22

[56] References Cited

U.S. PATENT DOCUMENTS

| | | | |
|---|---|---|---|
| 1,422,168 | 7/1922 | Barry | 301/63 D |
| 2,239,463 | 4/1941 | Mills | 301/20 |
| 2,874,998 | 2/1959 | Brink | 301/20 |
| 3,532,383 | 10/1970 | Unverferth et al. | 301/11 R |

*Primary Examiner*—H. Grant Skaggs
*Attorney, Agent, or Firm*—Cullen, Sloman, Cantor, Grauer, Scott & Rutherford

[57] ABSTRACT

A wheel rim clamping device is disclosed which has a plurality of pressure applying surfaces for clamping a concentric wheel rim to an axle hub assembly so as not to deform the rim and to improve the load transfer between the rim and hub. The clamping device, in one embodiment, includes an arcuately shaped main body portion and a plurality of alternatively offset, bent over, pressure applying surfaces along the outer longitudinal edge portion of the main body. The pressure applying surfaces grip both sides of an inwardly directed rim locator ring which extends around the interior periphery of the rim. Drive lug recesses are formed between the pressure applying surfaces to accept rim drive lugs which are spaced along the rim locator. The pressure applying surfaces and rim drive lugs lock the rim in place. The inner longitudinal edge portion of the main body includes downwardly extending and radially spaced apart depending leg portions which are mounted to the central axle hub assembly. The transverse end portions of the main body include semi-circular recesses, and the opposed semi-circular recesses on the end portions of a pair of side by side clamping devices form a mounting opening for an adjusting bolt. The adjusting bolt provides for both adjustability between the clamping devices and a more uniform clamping force against the rim by forcing the ends of adjacent clamping devices outwardly against the rim. A plurality of the clamping devices are mounted around the rim locator end-to-end thereby forming a substantially continuous annular mounting ring assembly between the hub and concentric wheel rim. In a second preferred embodiment, each of the pressure applying surfaces is arcuately shaped with a generally rectangular perimeter to provide more gripping area against the complementary arcuate sides of the rim locator.

3 Claims, 9 Drawing Figures

SEGMENTED WHEEL CLAMP

BACKGROUND OF THE INVENTION

The present invention relates to a clamping device for wheel rims, and more particularly, to an arcuately shaped clamp having a plurality of alternatively offset pressure applying surfaces for applying a clamping force to the rim so as not to deform it.

It is conventional to provide wheel clamps which are used to mount a concentric wheel rim to an axle hub assembly instead of the conventional one-piece wheel construction. The concentric wheel rim includes a plurality of inwardly projecting ring-like rim locators which are spaced apart along the longitudinal axis of the rim's interior periphery. This permits a mounted tire to be spaced at various lateral locations with respct to the machine frame which is particularly usful for tractors and the like where it is common to move the tires laterally outwardly or inwardly for tilling in crop rows or when over sized tires are used.

The prior art wheel clamps have produced an undesirable result in that they concentrate the clamping force at small areas on the surface of the rim locator. That is, the pressure is localized at a plurality of equally spaced apart radial positions around the rim locator which tends to cause the rim to deform at those positions. Thus, there has been a need for a wheel clamping device which spreads the clamping force over a greater area so as not to deform the rim and to provide improved uniform load transfer characteristics.

The disadvantages of present wheel clamping devices have resulted in the clamping device of the present invention which effectively extends the clamping force over a greater area to improve load transfer and to prevent rim deformation.

SUMMARY OF THE INVENTION

In accordance with the present invention, an arcuately shaped wheel rim clamping device is provided which has a plurality of pressure applying surfaces for clamping the rim to an axle hub assembly so as not to deform the rim and to improve the load transfer between the rim and hub.

In a first embodiment, the clamping device of the present invention includes an arcuately shaped main body portion and a plurality of offset, bent over, pressure applying surfaces along the outer longitudinal edge portion of the main body. These pressure applying surfaces grip both sides of an inwardly directed rim locator ring which extends around the interior periphery of the rim. Drive lug recesses are formed between the pressure applying surfaces to accept rim drive lugs which are spaced along the rim locator. The pressure applying surfaces and rim drive lugs lock the rim in place. The inner longitudinal edge portion of the main body includes downwardly extending and radially spaced apart depending leg portions which are mounted to the central axle hub assembly. A plurality of the clamping devices are mounted around the rim locator end to end thereby forming a substantially continuous annular mounting ring assembly between the hub and concentric rim.

The transverse end portions of the main body of the clamping device include semi-circular recesses, and the opposed semi-circular recesses on the end portions of a pair of side by side clamping devices form a mounting opening for an adjusting bolt. The adjusting bolt includes opposed conically shaped, bevel portions which are movable toward one another when the bolt is tightened. This forces the ends of the clamping devices outwardly which provides for both adjustability between the clamping devices and a more uniform clamping force against the rim.

The spaced apart depending leg portions from the main body of the clamping device also provide an advantage over prior constructions. The axle hub assembly includes a plurality of spaced apart radial mounting portions around its periphery to provide for multiple rim spacings from the machine frame. Each hub mounting portion includes laterally spaced side mounting surfaces so that the depending legs of the clamping devices can be mounted either outboard or inboard on the hub. Thus, the clamping devices of the present invention may be selectively mounted to plural positions on the hub and at different rim locators which permits several lateral locations of the mounted tire with respect to the machine frame.

In a second preferred embodiment, each of the pressure applying surfaces is arcuately shaped with a generally rectangular perimeter to provide more gripping area against the complementary arcuate sides of the rim locator. A pair of trasverse spaced apart reinforcing ribs are formed on the arcuate main body to provide additional radial stability from the central axle hub assembly to the concentric wheel rim. As in the first embodiment, a plurality of the clamping devices are mounted around the rim locator end-to-end thereby forming a substantially continuous annular mounting ring assembly between the hub and concentric rim.

Other advantages and meritorious features of the clamping device of the present invention will be more fully understood from the following description of the preferred embodiment, the appended claims, and the drawings, a brief description of which follows.

DETAILED DESCRIPTION OF THE INVENTION

A first embodiment of a wheel assembly including the clamping device made in accordance with the teachings of the present invention is illustrated in FIGS. 1–6.

Figure 1:
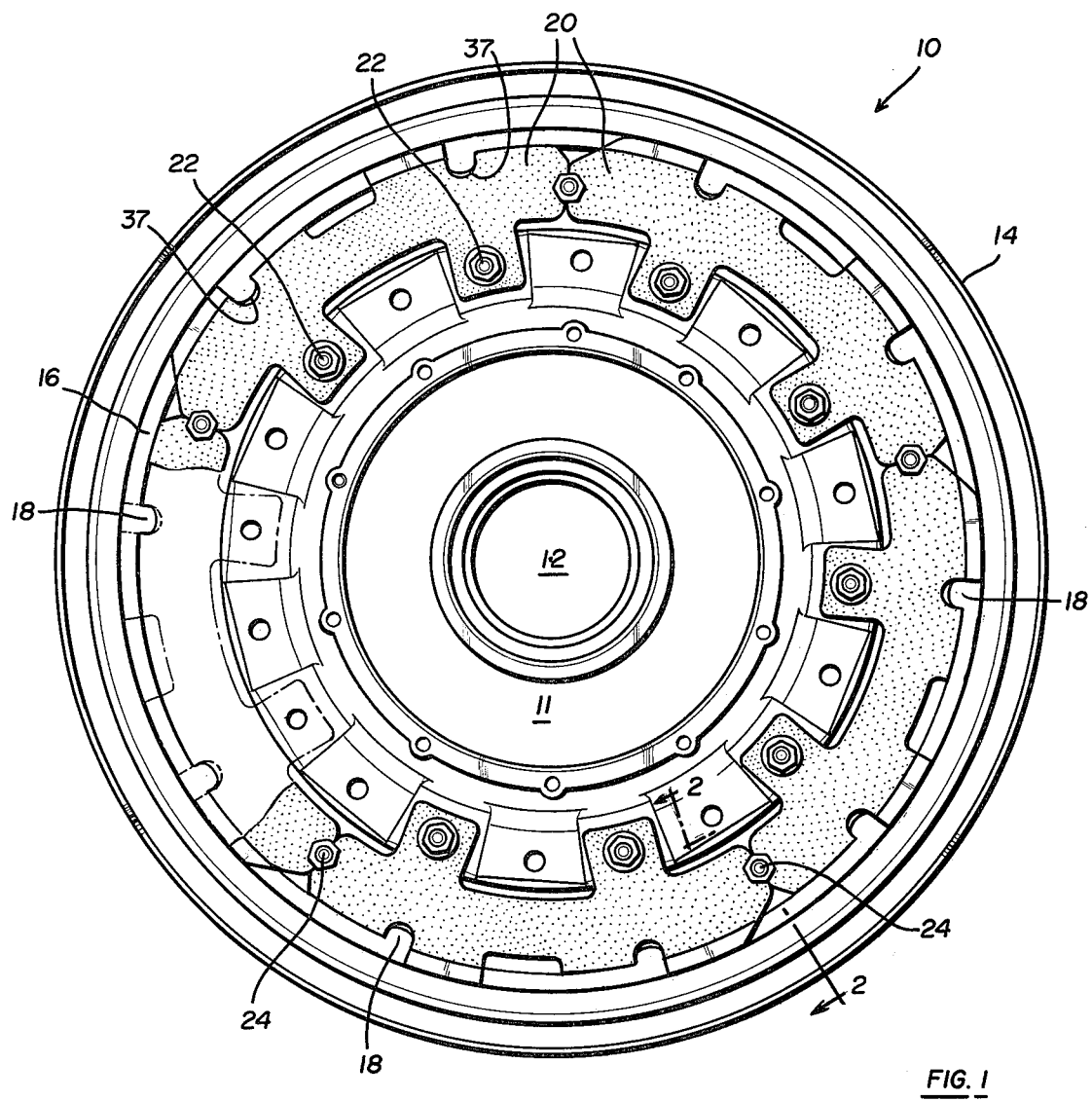
FIG. 1 is a side elevational view of an axle hub and wheel rim assembly incorporating a plurality of the clamping devices made in accordance with a first embodiment of the present invention.

The wheel assembly 10 shown in FIG. 1 is seen to include hub 11, axle 12, and concentrically mounted rim 14. Rim 14 includes a plurality of radially, inwardly projecting ring-like rim locators 16, 17 (FIG. 2) which are spaced apart along the longitudinal axis of the rim's interior periphery. The rim locators 16, 17 permit a mounted tire (not shown) to be spaced at various lateral locations with respect to the machine frame (not shown) which is particularly useful for tractors and the like where it is common to move the tires laterally for crop tilling operations or when oversized tires are used.

In accordance with the present invention, an arcuately shaped rim clamping device 20 is provided which has a plurality of pressure applying surfaces 36 for clamping rim 14 to the axle hub assembly 11, 12 so as not to deform the rim and to improve the load transfer between the rim and axle hub assembly.

Figure 2:
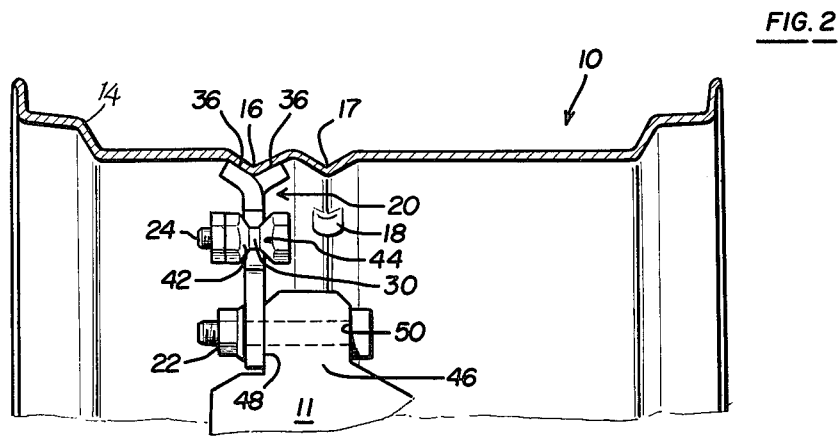
FIG. 2 is a cross sectional view taken along line 2—2 of FIG. 1 illustrating the adjusting bolt, rim locators, and multiple hub mounting positions.
Figure 3:
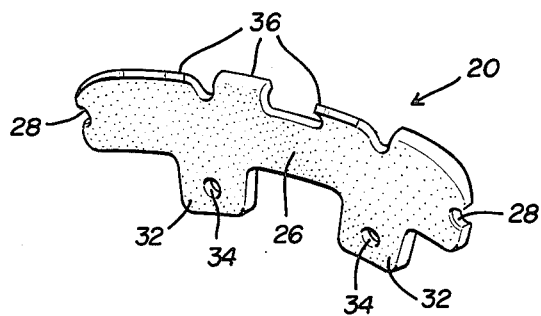
FIG. 3 is a perspective view of a first embodiment of the clamping device of the present invention.
Figure 4:
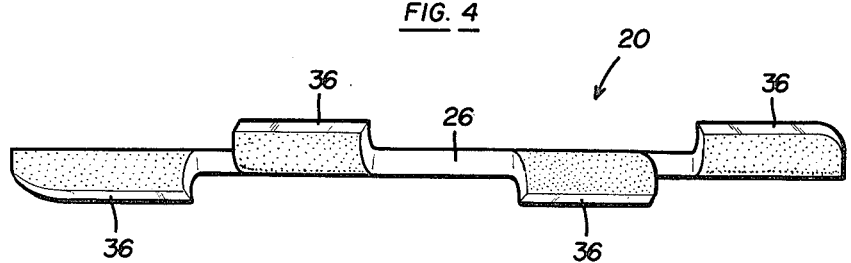
FIG. 4 is a top elevational view of the clamping device illustrated in FIG. 3.
Figure 5:
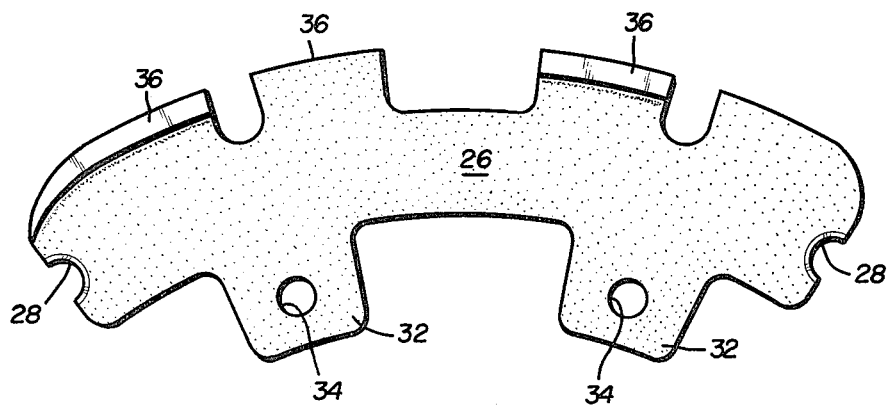
FIG. 5 is a side elevational view of the clamping device illustrated in FIG. 3.
Figure 6:
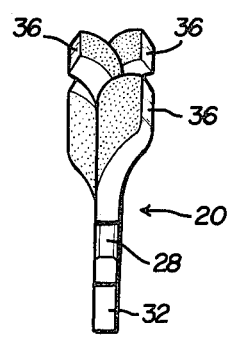
FIG. 6 is an end view of the clamping device illustrated in FIG. 3.

The clamping device 20 of the present invention includes an arcuately shaped main body portion 26 and a plurality of offset, bent over, pressure applying surfaces 36 along the outer arcuate longitudinal edge portion of the main body 26. As illustrated, surfaces 36 are alternatively bent to extend laterally at an acute angle with respect to the plane of the main body portion 26, and one-half of the surfaces are bent to extend in one lateral direction while the remaining surfaces are bent to extend in an opposite lateral direction. Pressure-applying surfaces 36 grip both sides of a selected rim locator ring 16, 17 as illustrated in FIG. 2. Drive lug recesses 37 are formed between the pressure applying surfaces 36 to accept rim drive lugs 18 which are spaced along the rim locators 16, 17. The pressure applying surfaces 36 and rim drive lugs 18 lock the rim in place with respect to the hub axle assembly and machine frame.

The inner arcuate longitudinal edge portion of the main body 26 includes downwardly extending and radially spaced apart depending leg portions 32. A plurality of the clamping devices 20 are mounted to the central axle hub assembly by mounting bolts 22 which pass through openings 34 in depending leg portions 32. A plurality of the clamping devices 20 are mounted around the selected rim locator end to end thereby forming a substantially continuous annular mounting ring assembly between the hub axle assembly 11, 12 and the concentric rim 14.

The transverse end portions of the clamping device main body 26 include semi-circular recesses 28. The opposed semi-circular recesses 28 on the end portions of a pair of side by side clamping devices 20 form a mounting opening for adjusting bolt 24 as illustrated in FIGS. 1 and 2. Adjusting bolt 24 includes opposed conically shaped, bevel portions 42, 44 which are movable towards one another along central bolt portion 30 when adjusting bolt 24 is tightened. This forces the ends of the respective clamping devices outwardly which provides for both adjustability between the clamping devices and a more uniform clamping force against the rim 14.

The spaced apart depending leg portions 32 from the clamping device main body 26 also provide an advantage over prior constructions. The hub assembly 11 includes a plurality of spaced apart radial mounting portions 46 around its periphery to provide for multiple rim spacings from the machine frame. Each hub mounting portion 46 includes laterally spaced side mounting surfaces 48, 50 so that the depending legs 32 of the clamping devices can be mounted either outboard or inboard on the hub. Thus, the clamping devices 20 of the present invention may be selectively mounted to plural positions on the hub and at different rim locators 16, 17 which permits several lateral locations of the mounted tire with respect to the machine frame.

The rim clamping devices 20 of the present invention provide distinct advantages over prior rim clamping constructions. The prior clamping devices concentrated the clamping force at small areas around the surface of the rim locator. That is, the clamping pressure was localized at a plurality of equally spaced apart radial positions on the rim locator which tended to cause the rim to deform at those positions. Clamping device 20 of the present invention spreads the clamping force over a greater area so as not to deform the rim and to provide improved load transfer between the rim and hub axle assembly. Clamping devices 20 are mounted around the rim locator end to end thereby forming a substantially continuous mounting ring assembly between the hub and concentric rim 14 which effectively eliminates the undesirable load transfer characteristics of the prior clamping devices.

Further advantages are obtained from the adjusting bolts 24 which force the ends of the side by side clamping devices outwardly thereby permitting adjustability between the clamping devices as well as a more uniform clamping force against the rim. The present clamping device construction provides for easy assembly and disassembly of the rim to the hub and permits many spacings of the tire with respect to the machine frame because the clamping devices may be selectively mounted to plural positions on the hub and at different rim locators.

Figure 8:
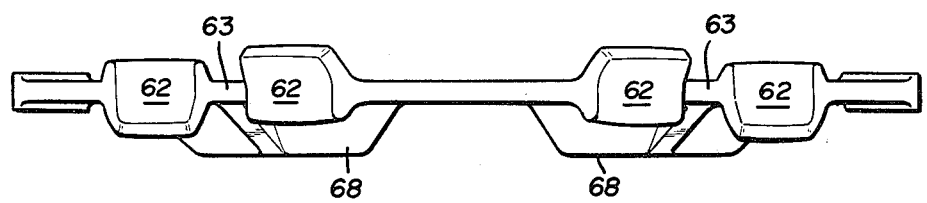
FIG. 8 is a top elevational view of the clamping device illustrated in FIG. 7.
Figure 7:
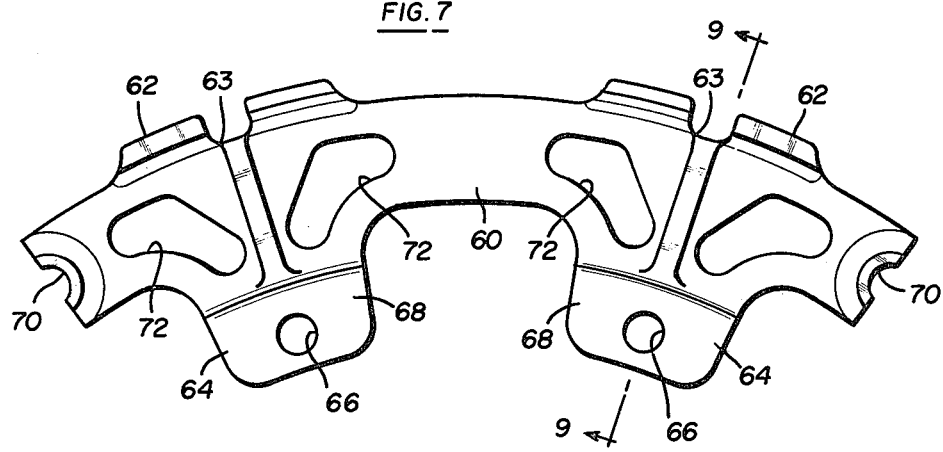
FIG. 7 is a side elevational view of a second preferred embodiment of the clamping device.
Figure 9:
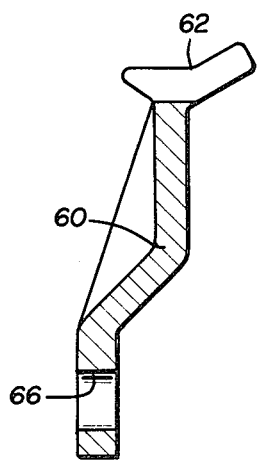
FIG. 9 is a cross-sectional view taken along line 9—9 of FIG. 7.

A second preferred embodiment of the clamping device is illustrated in FIGS. 7-9. In the second embodiment, an arcuately shaped rim clamping device 60 is provided which has a plurality of pressure applying surfaces 62 for clamping rim 14 to the axle hub assembly 11, 12 so as not to deform the rim and to improve the load transfer between the rim and axle hub assembly. Each of the pressure applying surfaces 62 is arcuately shaped with a generally rectangular perimeter to provide more gripping area against the complementary arcuate sides of a rim locator 16 or 17. Clamping device 60 includes an arcuately shaped main body portion and a plurality of alternatively offset pressure applying surfaces 62 along the outer arcuate longitudinal edge portion of the main body. As illustrated, surfaces 62 extend laterally with respect to the plane of the main body portion, and one-half of the surfaces extend in a first lateral direction while the remaining surfaces extend in an opposite lateral direction. Drive lug recesses 63 are formed between the pressure-applying surfaces 62 to accept rim drive lugs 18 which are spaced along the rim locator as illustrated in FIGS. 1 and 2. The pressure applying surfaces 62 and rim drive lugs 18 lock the rim in place.

The inner arcuate longitudinal edge portion of the main body includes downwardly extending and radially spaced apart depending leg portions 64. A plurality of the clamping devices 60 are mounted to the central axle hub assembly by mounting bolts 22 which pass through openings 66 in depending leg portions 64. Clamping devices 60 are mounted around the selected rim locator end-to-end thereby forming a substantially continuous annular mounting ring assembly between the hub axle assembly 11, 12 and the concentric rim 14.

Each clamping device 60 includes spaced apart reinforcing ribs 68 which are transverse to the longitudinal axis of the main body to provide increased radial stability between the hub axle assembly and concentric rim 14. The transverse end portions of the clamping device 60 include semi-circular recesses 70. The opposed semi-circular recesses 70 on the end portions of a pair of side-by-side clamping devices 60 form a mounting opening for adjusting bolt 24 as illustrated in FIGS. 1 and 2. Cut-outs 72 are provided in the main body portion of the clamping device 60 to reduce the weight requirement of the clamping device. The spaced apart depending leg portions 64 provide the same advantages as the first embodiment in that clamping devices 60 may be selectively mounted to plural positions on the hub and at different rim locators 16, 17 which permits several lateral locations of the mounted tire with respect to the machine frame.

It will be apparent to those skilled in the art that the foregoing disclosure is exemplary in nature rather than limiting, the invention being limited only by the appended claims.

We claim:

1. In a wheel assembly including an axle hub sub-assembly and a concentrically mounted wheel rim, said wheel rim including at least one radially, inwardly projecting ring-like rim locator, the improvement comprising:

a plurality of rim clamping devices being mounted side-by-side between said axle hub sub-assembly and said wheel rim thereby forming a substantially continuous annular mounting ring assembly;

each of said clamping devices including an arcuately shaped, generally planar, main body portion, said main body portion including an outer arcuate edge portion, an inner arcuate edge portion, and transverse end portions, a plurality of offset, pressure applying surfaces being integrally formed with said main body portion along said outer arcuate edge portion of said main body portion, spaced-apart depending leg portions being formed on said inner arcuate edge portion, each pressure applying surface extending in a direction which is transverse to the longitudinal axis of said generally planar arcuately shaped main body portion, and a plurality of said pressure applying surfaces extending in a first transverse direction and the remaining pressure applying surfaces extending in a second transverse direction, opposite to said first transverse direction;

each of said depending leg portions extending radially and means for mounting the depending leg portions of said clamping devices to said axle hub sub-assembly, and said pressure-applying surfaces of said clamping devices gripping said rim locator to thereby provide load transfer between said axle hub sub-assembly and said concentric wheel rim; and the transverse end portions of each clamping device including semi-circular recesses, the opposed semi-circular recesses on the end portions of a pair of side-by-side clamping devices forming a mounting opening, adjusting means being secured within said mounting opening for forcing the ends of the respective clamping devices and the pressure applying surfaces outwardly thereby providing a uniform clamping force against said rim.

2. The wheel assembly as defined in claim 1 wherein said axle hub sub-assembly includes a plurality of radially spaced-apart mounting portions, each mounting portion including laterally spaced side mounting surfaces, and said clamping devices being selectively mounted to said side mounting surfaces thereby permitting several lateral mounting positions of said rim with respect to said axle hub sub-assembly.

3. The wheel assembly as defined in claim 1 wherein each of said clamping devices includes drive lug recesses along said main body outer arcuate edge portion between said pressure applying surfaces, said rim locator including a plurality of rim drive lugs which engage said drive lug recesses to thereby lock said rim with respect to said axle hub sub-assembly.

* * * * *